US011556102B2

(12) United States Patent
Silva et al.

(10) Patent No.: US 11,556,102 B2
(45) Date of Patent: Jan. 17, 2023

(54) OFF-GRID ELECTRICAL POWER SYSTEM

(71) Applicant: UNITED RENEWABLE ENERGY, LLC, Alpharetta, GA (US)

(72) Inventors: William Grant Silva, Alpharetta, GA (US); Neal Robert Erickson, Gainesville, GA (US)

(73) Assignee: United Renewable Energy, LLC, Cummings, GA (US)

( * ) Notice: Subject to any disclaimer, the term of this patent is extended or adjusted under 35 U.S.C. 154(b) by 146 days.

(21) Appl. No.: 17/019,744

(22) Filed: Sep. 14, 2020

(65) Prior Publication Data
US 2020/0409325 A1 Dec. 31, 2020

Related U.S. Application Data

(63) Continuation-in-part of application No. 16/059,460, filed on Aug. 9, 2018, now Pat. No. 10,811,883.

(51) Int. Cl.
*G05B 19/042* (2006.01)
*H02S 10/10* (2014.01)
(Continued)

(52) U.S. Cl.
CPC ............ *G05B 19/042* (2013.01); *H02S 10/10* (2014.12); *H02S 20/10* (2014.12); *H02S 40/32* (2014.12);
(Continued)

(58) Field of Classification Search
CPC ................. B21B 27/03; G05B 19/042; G05B 2219/2639; H02J 13/00001;
(Continued)

(56) References Cited

U.S. PATENT DOCUMENTS 8,242,634 B2 8/2012 Schatz et al.
8,269,374 B2 9/2012 De Caires
(Continued)

OTHER PUBLICATIONS (PCT) U.S. Patent and Trademark Office (ISA/US), International Search Report and Written Opinion of the International Searching Authority, International Application No. PCT/US2021/047084, 12 pages, dated Nov. 23, 2021.
(Continued)

*Primary Examiner* — Yuhui R Pan
(74) *Attorney, Agent, or Firm* — Thompson Hine LLP

(57) ABSTRACT

Various implementations power homes and businesses without needing to connect to electric utility company-provided power, i.e., they can operate off-grid. Generally the system includes solar panel racks (e.g., photovoltaic cells on sheets stabilized using ballasts, anchors, or mounting) that generate electrical power used to provide power to a building or that is stored on batteries. The system includes the solar panel racks and an enclosure to be installed at the premises and separate from the building. The enclosure includes the batteries and inverters that are electronically connected to the solar panel racks and batteries. The inverters are configured to convert direct current (DC) electricity from the solar power racks and batteries to alternating current (AC) electricity to provide power to the building via wires electrically connecting the inverters to the main panel of the building.

12 Claims, 7 Drawing Sheets

(51) Int. Cl.
*H02S 20/10* (2014.01)
*H02S 40/34* (2014.01)
*H02S 40/38* (2014.01)
*H02S 40/32* (2014.01)

(52) U.S. Cl.
CPC .............. *H02S 40/34* (2014.12); *H02S 40/38* (2014.12); *G05B 2219/2639* (2013.01)

(58) Field of Classification Search
CPC ........ H02J 2300/24; H02J 3/003; H02J 3/004; H02J 3/32; H02J 3/381; H02J 7/35; H02J 9/06; H02J 9/08; Y02B 10/10; Y02B 10/70; Y02B 70/30; Y02B 90/20; Y02E 10/56; Y02E 40/70; Y02E 70/30; Y04S 10/123; Y04S 10/40; Y04S 10/50; Y04S 20/12; Y04S 20/248; H02S 10/00; H02S 10/10; H02S 20/10; H02S 40/32; H02S 40/34; H02S 40/38
See application file for complete search history.

(56) References Cited

U.S. PATENT DOCUMENTS

| | | | |
|---|---|---|---|
| 8,463,449 | B2 | 6/2013 | Sanders |
| 8,502,129 | B2 | 8/2013 | Miller et al. |
| 8,539,724 | B2 | 9/2013 | Bullivant et al. |
| 9,059,600 | B2 | 6/2015 | Godrich et al. |
| 9,705,333 | B2 | 7/2017 | Clifton |
| 9,819,219 | B2 | 11/2017 | Annavajjhala et al. |
| 9,871,379 | B2 | 1/2018 | Cheng et al. |
| 2002/0017821 | A1* | 2/2002 | Panuce .................... H02J 9/04 307/64 |
| 2002/0024332 | A1 | 2/2002 | Gardner |
| 2009/0039705 | A1* | 2/2009 | Lyman .................. H01M 50/20 307/64 |
| 2011/0017200 | A1* | 1/2011 | Zwern .................... F24S 23/77 126/621 |
| 2011/0208365 | A1 | 8/2011 | Miller |
| 2011/0253193 | A1 | 10/2011 | Korman et al. |
| 2012/0130555 | A1* | 5/2012 | Jelinek .................. G01D 4/004 700/291 |
| 2012/0143383 | A1 | 6/2012 | Cooperrider et al. |
| 2014/0015324 | A1* | 1/2014 | Brennan .................. H02J 3/381 307/72 |
| 2014/0028241 | A1 | 1/2014 | Hixson |
| 2014/0046495 | A1 | 2/2014 | Magnussen et al. |
| 2014/0257585 | A1 | 9/2014 | Kubota |
| 2015/0066631 | A1 | 3/2015 | Clifton |
| 2015/0253789 | A1 | 9/2015 | Saussele et al. |
| 2015/0318706 | A1 | 11/2015 | Ilinca et al. |
| 2016/0111900 | A1 | 4/2016 | Beaston et al. |
| 2016/0241039 | A1 | 8/2016 | Cheng et al. |
| 2016/0324077 | A1 | 11/2016 | Frantzen |
| 2017/0324367 | A1 | 11/2017 | Collins |
| 2018/0066860 | A1* | 3/2018 | Carlson .................... F24F 11/77 |
| 2018/0076624 | A1 | 3/2018 | Gudgel et al. |
| 2019/0097569 | A1* | 3/2019 | Kurtz ...................... H02S 20/10 |
| 2019/0199256 | A1* | 6/2019 | Evans ........................ H02P 9/08 |

OTHER PUBLICATIONS

Meyer, Andrew, "Can you Store Energy from Solar Panels?", Home Battery, dated May 3, 2016, pp. 1-6.
"Installing the Enphase IQ Envoy?", Quick Install Guide, (Model ENV-IQ-AM1-240), 2017 Enphase Energy, pp. 1-6.
"Flexpower ONE FXR", Fully Pre-Wired Single Inverter System, Outback Power, 2017, pp. 1-2.
"IDES3 Residential—Echo Series" <18 KWH, Model IDES3-ECHO-18, iDemand Energy Storage, pp. 1-4.
MidNite Solar, Inc., MNE-240 Series E-panel Owner's Manuel, 2007, pp. 1-22.
"Simpliphi Your Power with AccESS to a fully integrated energy storage and management solution", Simpliphi power, 2018, Rev. 021518, pp. 1-2.
Solar Edge, "Making PV Systems Smarter", Solar Edge Residential Offering for Installers, dated Sep. 2017, pp. 1-17.
Sunverge, Renewable Made Reliable, AC-Coupled SIS North America, dated Nov. 2016, one page.
Sunverge, Renewable Made Reliable, DC-Coupled SIS North America, dated Oct. 2016, one page.
Powerwall, Tesla, dated Jan. 30, 2018, Tesla.com/energy.

* cited by examiner

OFF-GRID ELECTRICAL POWER SYSTEM

RELATED APPLICATIONS

This patent application is a continuation-in-part of U.S. patent application Ser. No. 16/059,460 filed Aug. 9, 2018, which is incorporated herein in its entirety.

TECHNICAL FIELD

The present disclosure generally relates to the provision of electrical power to houses and other buildings, and in particular, to systems, methods, and devices that use solar energy and other energy producing technologies to provide electrical power to buildings without needing to connect to a utility company-provided electrical power grid.

BACKGROUND

Electrical power can be produced at residential or commercial premises in various ways including, but not limited to, via photovoltaics, gas turbine-based generators, wind turbine-based generators, water-based turbine generators, and fuel cells. These energy producing technologies are commonly used in conjunction with electrical power provided via electrical grids that provide electrical power from remote sources, i.e., electrical utility company-provided electrical power.

The deployment of alternative (i.e., non-grid) energy producing technologies such as solar power at residential and/or commercial premises is often deterred by various physical, economic, and political considerations. For example, the inconvenience, disruption, safety concerns, and cost associated with having solar panels installed on the roof of the building and having electrical components occupying space within the building deters many potential adopters of these technologies.

SUMMARY

Various implementations disclosed herein include devices, systems, and methods that power residential and commercial buildings. The systems do not need to connect to electric utility company-provided power via the national electric grid, i.e., they can operate off-grid. Generally the systems include solar panel racks (e.g., photovoltaic cells on sheets stabilized using ballasts, anchors, or mounting) that generate electrical power that is stored in one or more batteries. The solar power racks are generally installed on the premises separate from the building (e.g., separate from the house or commercial building). The system also includes an enclosure to be installed at the premises and separate from the building. The enclosure can include one or more batteries configured to store electrical power as chemical energy. The enclosure includes one or more inverters electronically connected to the one or more solar panel racks and/or the one or more batteries. The one or more inverters are configured to convert direct current (DC) electricity from the one or more solar panel racks or the one or more batteries to alternating current (AC) electricity. The system can also include one or more electrical wires electrically connecting the system to the main electrical panel of the building. The main panel is configured to receive AC electricity from the system, e.g., from the one or more inverters, a generator, or another source, to power the building.

Other implementations provide a system that provides electrical power to a premises and that includes at a device having a processor and a non-transitory computer readable medium. The device executes instructions stored in the non-transitory computer-readable medium to control generator use and or electricity use. Specifically, the operations include, but are not limited to, receiving historical electricity usage data for a building, receiving weather data and/or climate data for the building's location, predicting expected electricity demand at the building based on the historical usage data, predicting expected electricity production by one or more racks of photovoltaic cells on a premises of the building based on the weather data and/or the climate data, and controlling generator use or electricity use based on the expected electricity demand and the expected electricity production.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
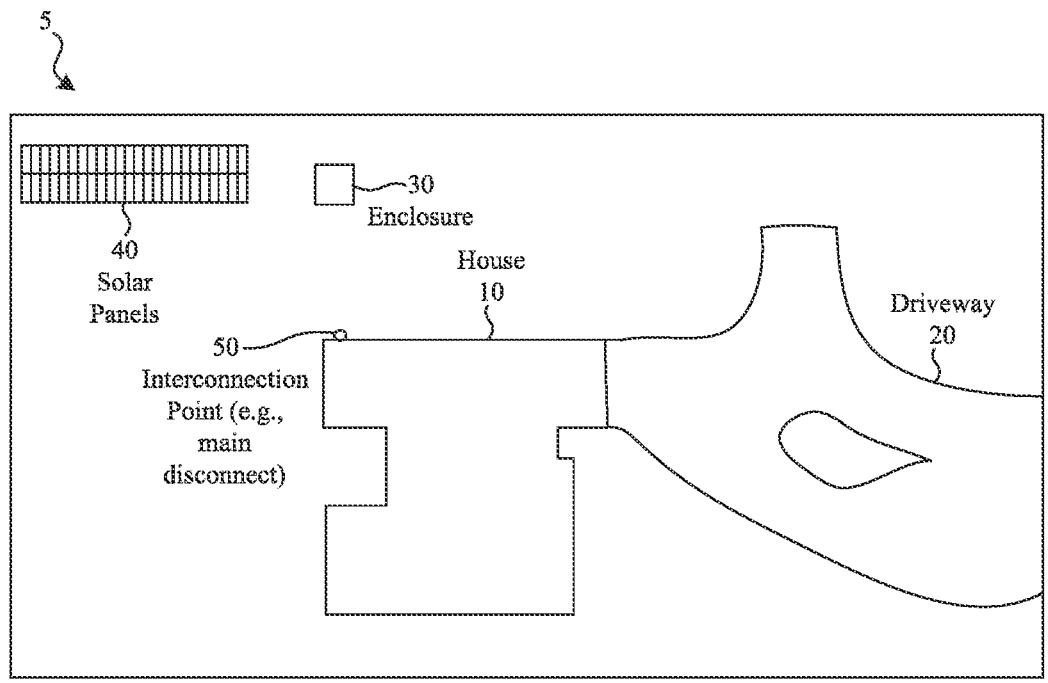
FIG. 1 is a block diagram of an example of an off-grid electrical power system deployed at a premises according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that power homes and businesses. The systems do not need to connect to electric utility company-provided power via the national electric grid, i.e., they can operate off-grid. For example, the systems can connect to the main interconnection point on the premises instead of the utility company-provided power system connecting to that main interconnection point. Thus, in contrast to existing solar power systems designed to connect to an interior electrical panel to provide supplemental or backup power, implementations of the invention provide systems that are configured to be the main or sole electrical power source for the premises, providing power to the main electrical power input connection on the premises.

Referring to FIG. 1, FIG. 1 is a block diagram of an example of an off-grid electrical power system deployed at a premises 5 to provide electrical power without needing to connect to or otherwise use electric utility company-provided power. The premises 5 in this example includes a contiguous area of land that includes a building, i.e., house 10, and driveway 20. Systems disclosed herein can provide electrical power to premises that include contiguous or otherwise associated areas of land on which one or more buildings are located. In the example of FIG. 1, the system includes an enclosure 30, housing various components and solar panels 40. The system connects, via electrical wires (not shown) to interconnection point 50, for example, to a main disconnect, at the house 10 to provide electrical power to all of the interior and/or exterior power requirements of the house 10.

The solar panels 40 can be mounted on racks and configured and positioned to absorb sunlight as a source of energy. The solar panels 40 can be mounted on the ground of the premises, a roof of the enclosure, and/or any other locations separate from the premises 5.

In some implementations, the solar panels 40 of the system include photovoltaic cells on sheets stabilized using ballasts, and/or anchors, for mounting. In some implementations, the solar panels 40 include photovoltaic modules that include packaged, connected assemblies of photovoltaic cells (e.g., an array of 6×10 solar cells). The solar panels 40 can include an array of photovoltaic modules that are connected to one another prior to delivery and/or during deployment at the premises 5. The solar panels 40 can use wafer-based crystalline silicon or thin-film cells. The solar panels 40 can include a structural (load carrying) member as either a top layer or a bottom layer and may be rigid or semi-flexible (e.g., in the case of thin-film cells). The solar panels 40 may include photovoltaic cells connected to one another in series and may include single contact connectors (e.g., Multi-Contact 4 mm diameter [MC4] connectors) to facilitate easy weatherproof connections to other components of the system. The connectors may be configured allow strings of solar panels 40 to be easily constructed by pushing the connectors from adjacent solar panels together by hand, while requiring a tool to disconnect the strings from one another to prevent accidentally disconnections.

The system is configured to connect directly to a main panel of the building. Thus, in some implementations, the main panel receives alternating current (AC) electricity from the one or more inverters, the generator, or other sources and provides the received AC electricity to power one or more buildings on the premises. Unlike existing roof-mounted solar panel systems that provide only supplemental power to buildings, implementations of the invention provide a system that can connect directly to the main panel of the building to provide electrical power to the entire building without requiring grid-supplied electrical power.

Figure 2:
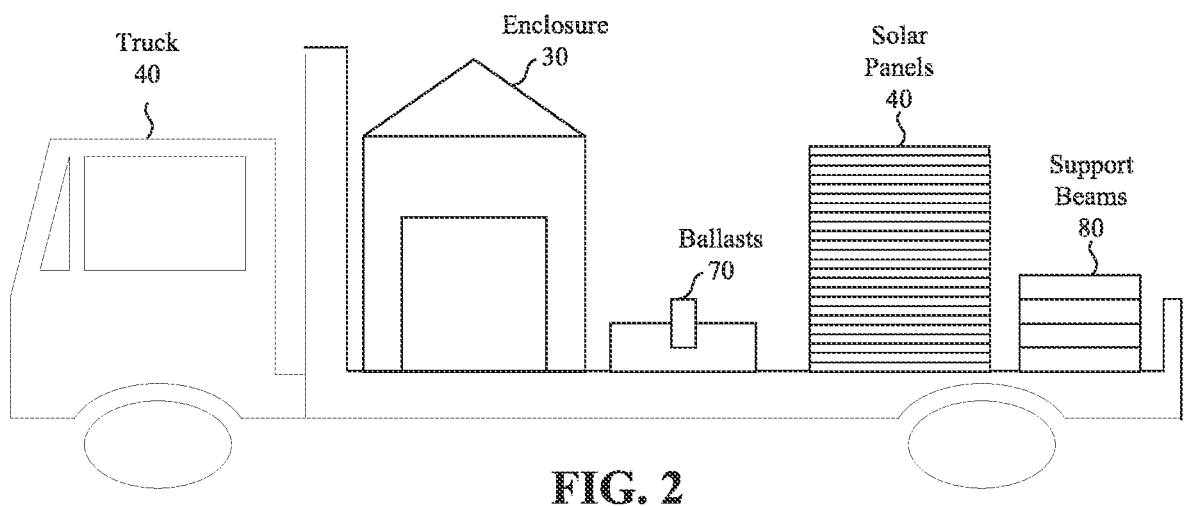
FIG. 2 is a block diagram illustrating an example of a truck loaded with the components of the off-grid electrical power system of FIG. 1 according to some implementations.

FIG. 2 is a block diagram illustrating an example of a truck 40 loaded with the components of the off-grid electrical power system of FIG. 1. In this example, the truck includes all of the components needed for a deployment of the system at the premises 5 of FIG. 1. Specifically, the truck 40 includes the enclosure 30 (including other system components that are, in some implementations, already installed and/or connected), the solar panels 40, the ballasts and/or anchors 70 to be used to mount the solar panels 40 on a ground surface of the premises 5, and support beams 80 used to support the solar panels 40 above the ground surface of the premises 5.

Figure 3:
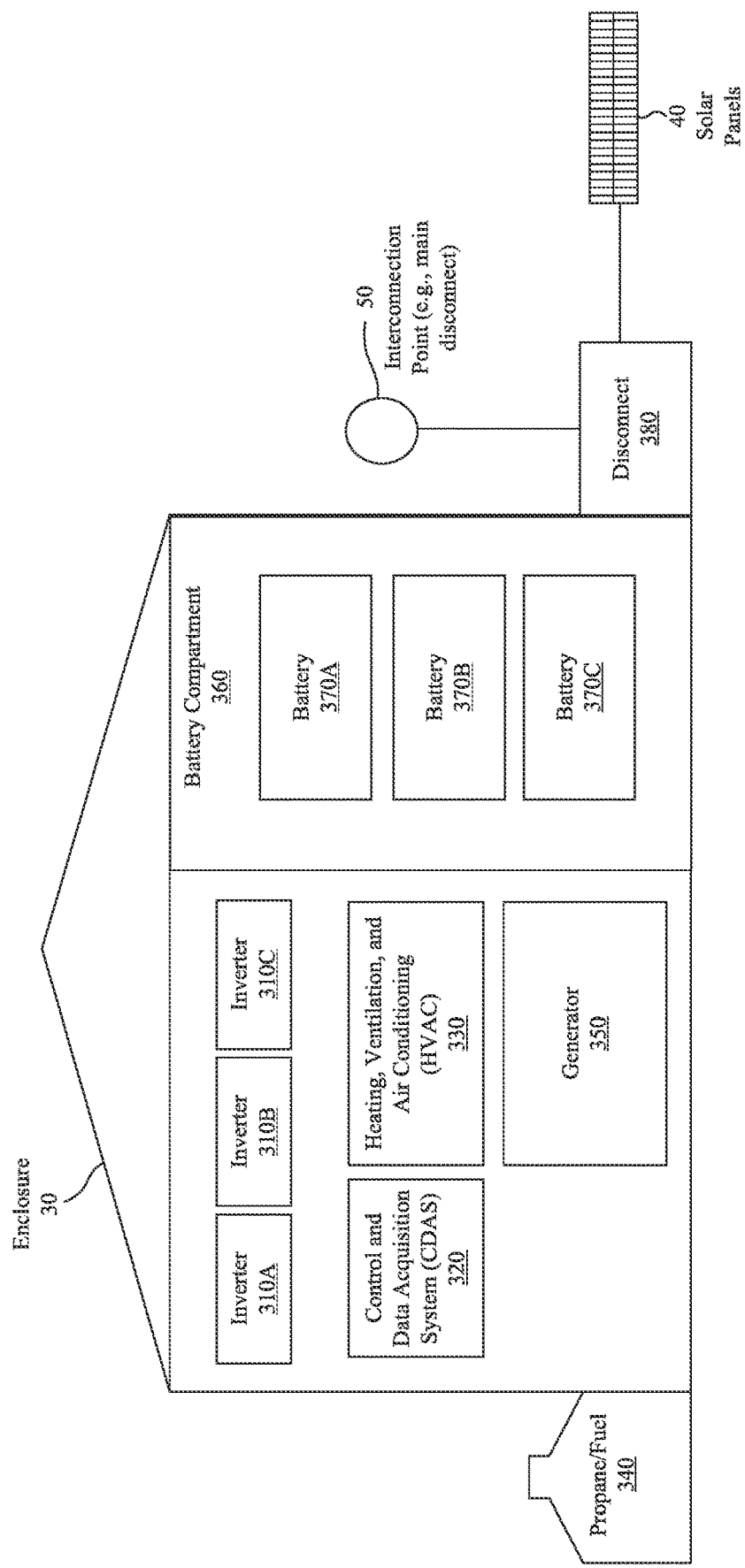
FIG. 3 is a block diagram illustrating an example of components of the off-grid electrical power system of FIG. 1 connected to an interconnection point to provide electrical power at a premises according to some implementations.

FIG. 3 is a block diagram illustrating an example of components of the off-grid electrical power system of FIG. 1 connected to an interconnection point 50 to provide electrical power at the premises 5. The system includes an enclosure 30 to be installed at the premises and separate from the building 10 (e.g., separate from any of the house(s) and/or commercial building(s) of the premises).

The enclosure 30 at least partially encloses a battery compartment 360 with batteries 370A-C that are configured to store the electricity received from the solar panels 40. Examples of batteries 370A-C include, but are not limited to, lithium ion batteries, sodium-sulfur batteries, sodium/nickel-chloride batteries, flooded lead-acid batteries, absorbent glass mat lead-acid batteries, and nickel metal hydride batteries, and nickel cadmium batteries. The storage capacity of the batteries 370A-C and/or the number of batteries included in the system can be selected based on the expected electrical power requirements of the premises 5.

The solar panels 50 may produce DC power that is used to directly charge the batteries 370A-C, e.g., via one or more charge controllers (not shown) that receive the energy from the solar panels 50 and use it to charge the batteries 370A-C.

The enclosure 30 at least partially encloses inverters 310A-C that can be electronically connected to the solar panels 40 and/or the batteries 370A-C. The inverters 310A-C can be entirely electronic or may use a combination of mechanical effects (e.g., rotary apparatus) and electrical circuitry. The inverters 310A-C can be configured to convert direct current (DC) electrical power from the solar panels 40, batteries 370A-C, and/or other source to alternating current (AC) electricity that can be used for the electrical power load of the premises. Additionally or alternatively, the inverters 310A-C can be configured to receive AC electricity from the generator 250 and/or another AC source (e.g., a wind generator, a geothermal generator, a grid connection, etc.) and rectify that AC electrical power into DC electrical power used to charge the batteries 370A-C. Thus, in various implementations, the batteries 370A-C can be charged from the solar panels 40, the generator 350, from the electrical company provided power grid (if available), or from other available sources. The inverters 310A-C may be linked together to address the varying electrical power requirements of different premises, e.g., larger premises/buildings may have significantly greater power requirements.

In some implementations, the enclosure 30 at least partially encloses a generator 350. The enclosure can enclose, be located proximate to, or otherwise connect via a fuel line to propane/fuel 340, e.g., a liquid propane (LP) tank, to provide backup for or otherwise supplement the electrical power provided by the solar panels 40. The generator 350 produces electrical power from mechanical energy, which is provided to the generator 350 in the form of fuel (e.g., natural gas, liquid propane, gasoline, or diesel). Electrical power is created by converting motorized power from the combustion of the fuel into electrical power. For example, propane may be burned by a propane-based generator to produce energy/heat that heats a substance (e.g., a mix of water and ammonia) in the generator to its burning point, leading to the production of ammonia gas, which flows through the generator to produce electrical energy. As another example, gas may be used to power a gas-powered engine that turns an on-board alternator to generate electrical power.

In other implementations, the generator 350 and/or fuel tank (e.g., LP tank 340) are located outside of the enclosure, for example, on a portion of the premises 5 proximate to the enclosure 30.

In some implementations, the generator 350 is used in a support scenario based on limitations of the inverters 310A-C. For example, the inverters 310A-C may have a maximum output of 15 kilowatts for a period of 15-30 minutes and the batteries 370A-C may be depleted or the electrical power load may continue for too long. In such circumstances, the generator 350 can be utilized to provide power to satisfy the power load.

In some implementations, such as in the example of FIG. 3, the system also include a control and data acquisition system (CDAS) 320 that communicates (e.g., via cellular or other wireless communication technology) with a remote system to provide data (e.g., electrical power usage data), obtain data (e.g., weather forecasts), and facilitate remote control of the system. In some implementations, the CDAS 320 is configured to track solar power generation, electrical power usage, and other system attributes and environment features over time. For example, the CDAS 320 may be configured to collect and act upon historical data regarding load at different times of the day (e.g., electrical power consumption being greater at certain times based dryer usage, occupants returning home, etc.). The CDAS 320 may identify patterns, e.g., time of day, daily, weekly, monthly, seasonal, etc. For example the CDAS 130 may determine that electrical consumption of certain appliances is less common during the summer. The CDAS could then notify the building's occupants of these trends.

The CDAS 320 uses historical data on consumption, production, and other information to efficiently use the system components and resources. This can avoid the need for the system to include unnecessary capacity, e.g., larger, more expensive batteries and propane tanks, etc., to otherwise address extreme circumstances. Rather the CDAS 320 is able to make predictions and use those predictions to manage component usage intelligently. For example, the CDAS 320 may trigger different modes to conserve stored power levels at certain times. The CDAS 320 may make determinations automatically and/or use user preferences, commands, information from a home automation system, etc. In one example, the CDAS 320 tracks which appliances are being used and makes recommendations based on system usage. As a specific example, the CDAS 320 may send a request to the user (e.g., to the user's mobile device and/or computer) requesting that the user approve shutting off the water heater for a period of time to improve system efficiency or performance. The CDAS 320 may present information for a user interface on the users' computers or mobile devices that allows the users to select appliances to activate, deactivate, ramp up, ramp down, schedule activation/deactivation, etc. Accordingly, the CDAS 320 can make automated or semi-automated decisions consistent with the users' preferences and control to ensure that the automated changes do not undesirably impact the user. The CDAS 320 can thus improve system performance and efficiency without requiring the users to undesirably or dramatically change their lifestyles.

The CDAS can provide predictive control features for example by employing algorithms that utilize usage data, weather data, and system data to predict power usage needs, anticipate solar power generation, and/or recommend/automatically control battery and/or generator usage accordingly. The system can include intelligent/remote control features such as algorithms that allow users to control the system and/or regulate power generation and/or consumption (e.g., by turning off appliances, etc.). The system may include management features that facilitate load dumping, e.g., where too much power is available and the user may want to add an electrical load to use the extra power. The system may also be configured to switch between modes, such as a full power mode, an energy save mode, and an emergency power mode.

In some implementations, such as in the example of FIG. 3, the enclosure 30 is a shed-type structure having a roof (e.g., slanted to facilitate runoff of precipitation) and one or more walls that house some or all of the components outside of the residence/building. The enclosure 30 can be shaped, sized, and/or have other attributes that facilitate simple and efficient delivery of the system components, as well as pleasing aesthetic, weather protection, security, and safety. In some implementations, the enclosure 30 is located beneath the solar panels to reduce the footprint of the system.

In some implementations, such as in the example of FIG. 3, the enclosure 30 includes heating, ventilation, and air/conditioning HVAC components 330, which may be controlled by the CDAS 320. The HVAC components 330 can monitor temperature, humidity, and/or other conditions within the enclosure and produce heat, air-conditioning, or otherwise control these conditions to facilitate the efficient, safe, and continuous operation of the system.

In some implementations, such as in the example of FIG. 3, the enclosure 30 includes a disconnect 380 that facilitates disconnecting the components of the enclosure 30 from the interconnection point 50 and/or the solar panels 40. The disconnect 380 can facilitate quicker deployment by reducing or eliminating the need to go within the enclosure 30 during deployment to connect the components to the interconnection point 50 and/or the solar panels 40. In some implementations, the enclosure 30 has externally facing outlets for connecting devices to use excess load.

The system depicted in FIGS. 1-3 can be simpler, quicker, and less expensive to deliver, install, and maintain than existing solar power systems. The components of the system can be separate from the building, e.g., house 10. For example, the solar panels 40 can be positioned on the ground outside of the house 10 rather than on the roof of the house 10. Many of the other components of the system can be located within the enclosure 30 or otherwise on the grounds outside of the house 10. As a result, the system can be installed without needing to access the interior or roof of the house 10, without disrupting the residents/occupants, without altering the house 10, without occupying space within the house 10, without creating safety concerns within the house 10, and without otherwise interfering with the house's use or operation.

In some implementations, fast and efficient deployment of the system is facilitated by attributes of the enclosure 30 including, but not limited to, the enclosure 30 having components installed, mounted, and pre-connected (prior to delivery) to one another, enclosure apertures designed for accessing and connecting components during deployment and maintenance, weight distribution for improved mobility and stability, and other features such as apertures that facilitate using a forklift to unload the enclosure from a truck.

Attributes of the solar panels 40 of the system can additionally be configured to facilitate easy deployment and/or enable deployment on uneven terrain. For example, the racks upon which the solar panels 40 will be mounted may use ballasts having attributes (e.g., light weight, separable weights, etc.) that facilitate easier transport from a truck to a deployment location.

Figure 6:
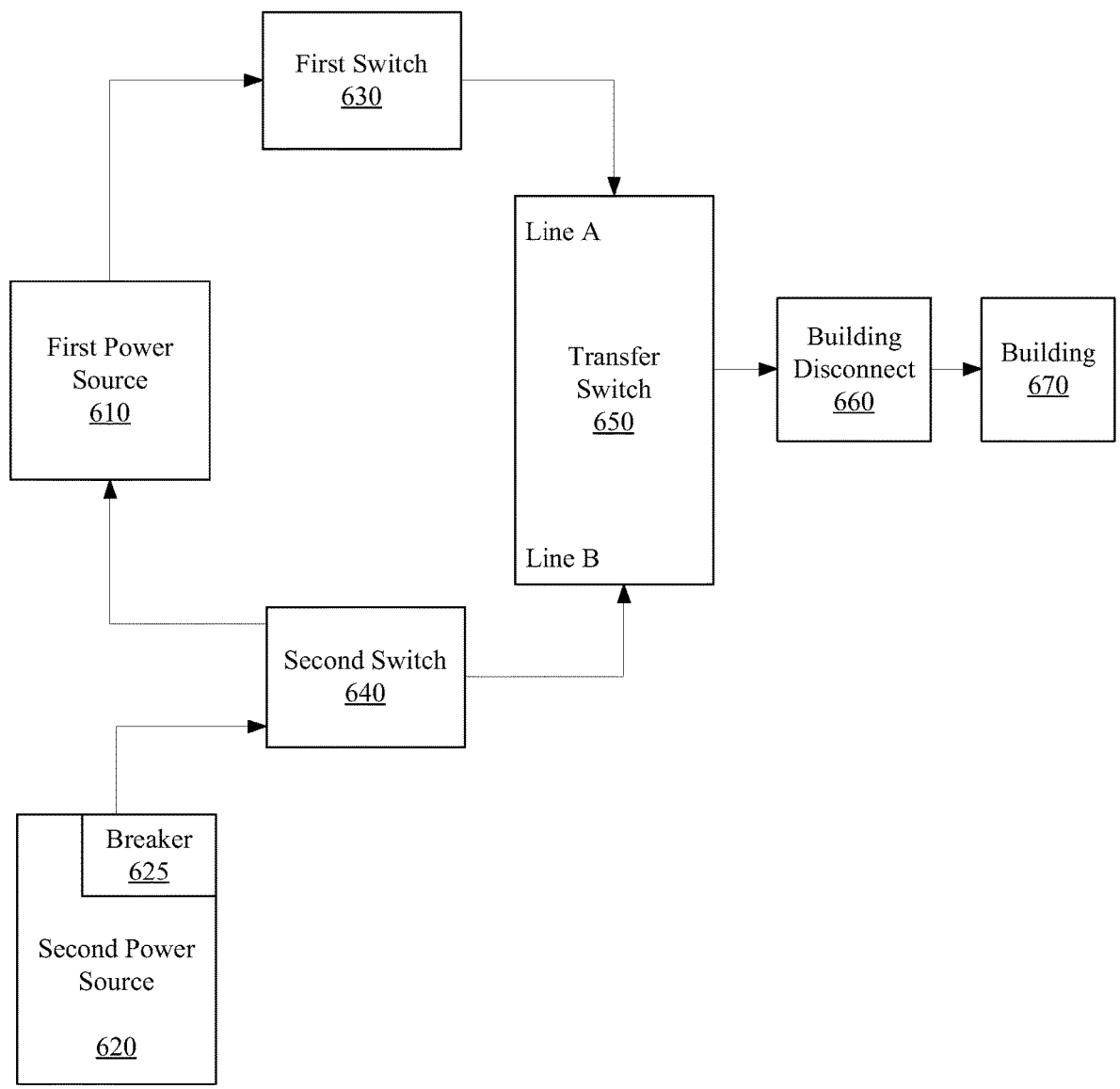
FIG. 6 illustrates an exemplary power system providing redundant power sources according to some implementations.

FIG. 6 illustrates an exemplary power system providing redundant power sources. The power system includes a first power source 610 and a second power source 620, which may be the same or different types of power sources.

In some implementations, the first power source 610 includes one or more batteries configured to store energy generated by the one or more solar panel racks of photovoltaic cells. The first power source 610 may include one or more inverters electronically connected to the one or more solar panel racks and one or more batteries. Such one or more inverters may be configured to convert direct current (DC) current electricity from the one or more solar panel racks and the one or more batteries to alternating current (AC) electricity.

In some implementations, the second power source 620 includes one or more generators. The one or more generators may be configured to receive fuel from a fuel tank. A power source may include additional components, such as a breaker. For example, as illustrated in FIG. 6, the second power source 620 may include a breaker 625 (e.g., a 60A breaker) to regulate power provided by the second power source 620.

In some implementations, one or both of the power sources 610, 620 are installed within (e.g., at least partially enclosed by) or near an enclosure that is installed at a premises of a building to which power is provided.

The power system of FIG. 6 includes components that facilitate providing power to a building in different modes. The components (e.g., switches), may enable, for example, a normal mode in which power is provided to the building from the first power source, a bypass mode in which power is provided to the building from the second power source, and an isolation mode in which no power is provided to the building from the first power source and no power is provided to the building from the second power source. The components (e.g., switches) may be located on exterior (or equivalently within a threshold distance of) an enclosure that at least partially encloses one or both of the power sources. Locating the components (e.g., switches) on the exterior or near the exterior of such an enclosure may facilitate installation, removal, and/or use of the system at the premises.

In some implementations, the system, as illustrated in FIG. 6, includes a first switch 630 configured to connect the first power source 610 to a first side (e.g., Line A) of a transfer switch 650 when switched on and to disconnect the first power source 610 from the transfer switch 650 when switched off. The first switch 630 may be a bypass switch. The first switch 630 may be an electrical disconnect. The first switch 630 may be a breaker switch housed in one or more exterior boxes on an enclosure that houses at least some of one or both of the power sources 610, 620.

In some implementations, the system, as illustrated in FIG. 6, includes a second switch 640 configured to connect the second power source to a second side (e.g., Line B) of the transfer switch 650 when switched on and to disconnect the second power source 640 from the second side of the transfer switch 650 when switched off. The second switch 640 may be further configured to connect the second power source 620 to provide power to the first power source 610, e.g., to one or more batteries, when switched on. The second switch 640 may be an electrical disconnect. The second switch 640 may be a breaker switches housed in one or more exterior boxes on an enclosure that houses at least some of one or both of the power sources 610, 620.

In some implementation, the transfer switch 650 is configured to switch to receive power from the second side (e.g., Line B) of the transfer switch 650 based on not receiving sufficient power at the first side (e.g., Line A) of the transfer switch 650. The transfer switch 650 may be configured to send a signal to initiate power generation from the second power source 610 (e.g., to start a generator) based on no power being received at the first side (e.g., Line A) of the transfer switch 650.

The transfer switch 650 is connected to provide electricity to the building 670 via a connection at a building disconnect 660. In some implementations, the system connects to a main panel of the building 670 that is configured to receive electricity from the system and provide the received electricity to power the building.

Some implementations provide a system in which there is one power source producing AC power contained in an enclosure and a backup power source on site (e.g., either generator or utility) that shall back up the first power source. In this example, to ensure consistent and stable power to the loads (e.g., home or other building), there is a transfer switch on a side of the enclosure that can alternate between two sources of power (first source and backup). Prior to the electricity reaching this transfer switch, there are two switches to allow for multiple possible modes, e.g., normal, bypass, and complete isolation/shutdown.

In this example, the disconnecting switch that is in line with the AC power output of the first power source is the bypass switch. When the switch is closed (on), the power will flow through to the primary AC input side of the transfer switch. When the switch is open (off), no power will reach the primary AC input side of the transfer switch which will cause the transfer switch to shift to the secondary (backup) AC input. This switch from primary to secondary AC input will, in the case of having a generator as the backup AC source, send a signal to start the backup power source, e.g., a generator. This will ensure that the secondary side of the transfer switch shall have power sufficient to power the loads.

The disconnecting switch that is in line with the AC power output of the backup AC source (e.g., generator or utility), is the isolation/full shutdown switch. When the switch is closed (on), the power will flow through to the secondary AC input side of the transfer switch and also the primary system (e.g., the first power source's batteries). This will not provide any power to the loads while the system is in normal operation, but will provide backup charging and power. When the switch is open (off), no power from the backup source will reach either the first power source's batteries or the secondary AC input of the transfer switch.

When the bypass switch is open (off) and the isolation/full shutdown switch is closed (on), the system will be in bypass mode. The only AC power that will flow through the transfer switch to the loads will come from the Backup power source (e.g., generator or utility).

When both the bypass switch and the isolation/full shutdown switch are in the closed (on) position, the system will be in normal operation mode. When both the bypass switch and the isolation/full shutdown switch are open (off), there will be no AC power output to the loads and the system will be in complete isolation/shutdown mode.

Figure 7:
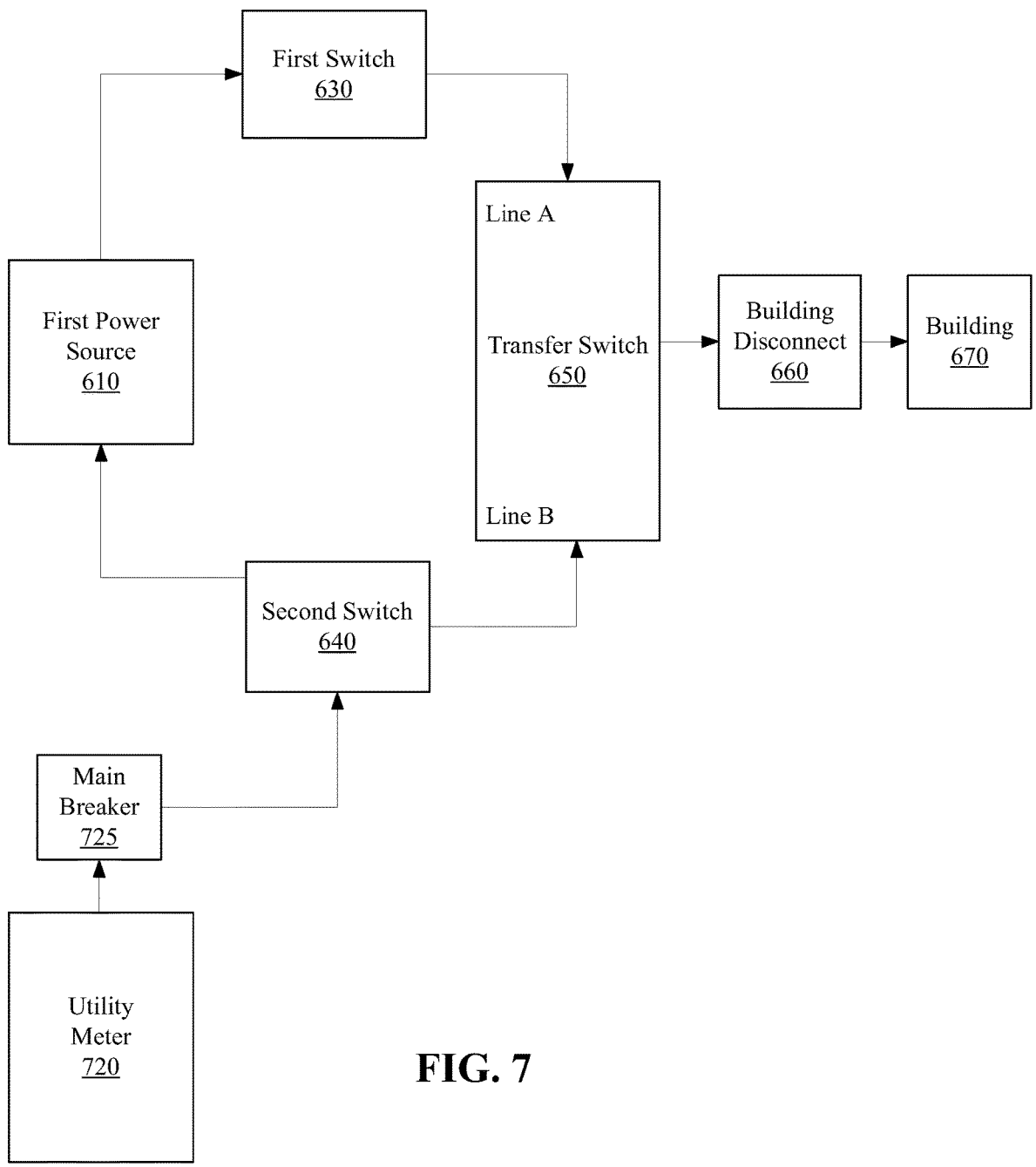
FIG. 7 illustrates another exemplary power system providing redundant power sources according to some implementations.

FIG. 7 illustrates another exemplary power system providing redundant power sources according to some implementations. In comparison to the system illustrated in FIG. 6, the system illustrated in FIG. 7 uses utility power as the second power source. Accordingly, the second stitch 640 is configured to receive power via a main breaker 725 that receives power via utility meter 720.

Figure 4:
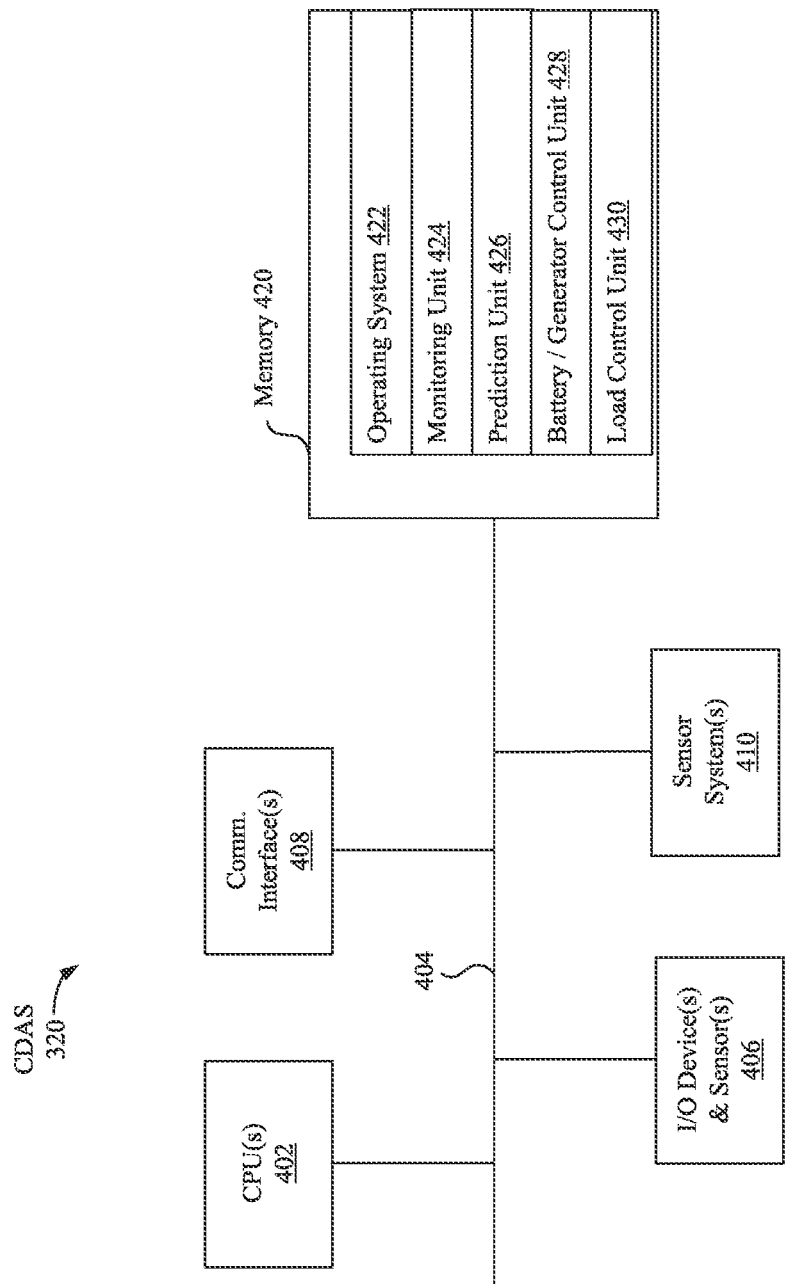
FIG. 4 is a block diagram illustrating device components of an exemplary control and data acquisition system (CDAS) according to some implementations.

FIG. 4 is a block diagram illustrating device components of an exemplary CDAS 320. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 402 (e.g., microprocessors, ASICs, FPGAs, GPUs, CPUs, processing cores, or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more displays (not shown), and one or more sensor systems 410, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of a touch screen, a softkey, a keyboard, a virtual keyboard, a button, a knob, a joystick, a switch, a dial, a microphone, a speaker, a haptics engine, or the like. In some implementations, the one or more sensor system(s) 410 include at least one of an electrical meter or other device that measures electrical consumption or electrical production, a battery tester or other device that measures energy stored on a battery, a thermometer, a barometer, an image sensor, a sound sensor, a chemical sensor, an inertial measurement unit (IMU), an accelerometer, a magnetometer, or a gyroscope.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and one or more module 440.

The operating system 430 includes procedures for handling various basic system services and for performing hardware dependent tasks. The modules 440 include a monitoring unit 424, a prediction unit 426, a battery/generator control unit 428, and a load control unit 430. The monitoring unit 424 monitors energy consumption, energy production, energy storage and other system and environmental data based information from the one or more sensor system(s) 410, a home automation system, and/or from other sources, such as network climate/weather resources, other network sources, as well as user-provided information. The prediction unit 426 is configured to make predictions regarding energy consumption, energy production, energy storage and other system and environmental attributes based on the information monitored by the monitoring unit 424. The battery/generator control unit 428 is configured to control the battery/generator (e.g., determining when the generator will be run, when energy will be allocated from the batteries or generator to power the load, etc. The battery/generator control unit 428 is configured to make these allocations based on rules, algorithms, user commands and combinations thereof based on the information monitored by the monitoring unit 424 and/or the predictions made by the prediction unit 426. The load control unit 430 is configured to control one or more appliances or other power consuming devices or connects (or the overall power load) at the premises. The load control unit 430 may control the load based on rules, algorithms, user commands and combinations thereof based on the information monitored by the monitoring unit 424 and/or the predictions made by the prediction unit 426.

Generally, the modules are configured to control the system, analyze data and communicate wirelessly with a remote system to obtain data and control the system. The CDAS 320 may determine expected electricity demand (e.g., based on historical electricity usage data for the premises) and/or expected electricity production (e.g., weather forecast or climate data associated with the location of the premises) and control the system based on the expected electricity demand and expected electricity production. The CDAS 320 may determine the expected electricity demand.

In some implementations, CDAS 320 is configured to provide a predictive control feature that uses historical usage data, tariff data, electrical-grid rate data, and/or weather data to predict expected electricity demand at the premises, predict expected electricity production, and/or provide recommendations regarding battery use or generator use.

In some implementations, CDAS 320 is configured to provide a predictive control feature that uses historical energy usage data, tariff data, electrical-grid rate data, calendar information, and/or weather data to predict expected electricity demand at the premises, predict expected electricity production, and/or automatically control battery use or generator use.

In some implementations, CDAS 320 is configured to provide an electrical load dumping feature that uses data which includes, but is not limited to: historical usage data, tariff data, electrical-grid rate data, and/or weather data to predict expected electricity demand at the building, predict expected electricity production, and/or provide recommendations regarding electricity that will be wasted unless load is increased.

In some implementations, CDAS 320 is configured to provide a load control feature that uses historical usage data, tariff data, electrical-grid rate data, or weather data to predict expected electricity demand at the building, predict expected electricity production, and/or automatically control and increase electricity usage on selected loads to avoid wasting electricity.

In some implementations, CDAS 320 is configured to provide a battery control feature to control (e.g., limit) recharging of the one or more batteries from a generator based on expected electrical demand and/or to control (e.g., limit) a battery charging cycle by varying depth of discharge based on battery parameters.

FIG. 4 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately could be implemented in a single module and the various functions of single functional blocks could be implemented by one or more functional blocks in various implementations. The actual number of modules and the division of particular functions and how features are allocated among them will vary from one implementation to another based on unique individual attributes of each individual implementation, and, in some implementations, depends in part on the particular combination of hardware, software, or firmware chosen for a particular implementation.

Figure 5:
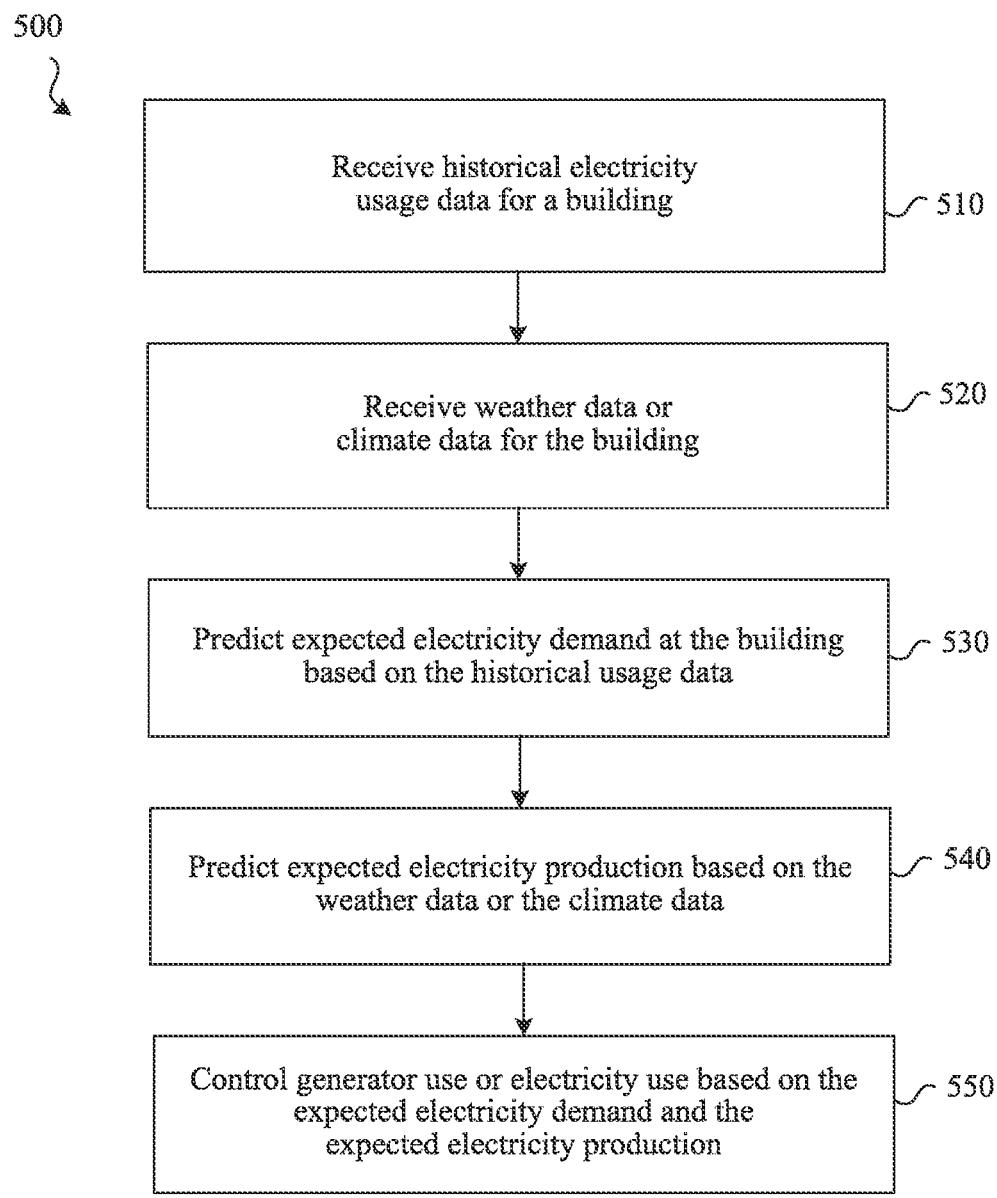
FIG. 5 is a flowchart representation of a method for controlling generator use and or electricity use at a premises to which electrical power is provided by one or more non-grid electrical power producing technologies.

FIG. 5 is a flowchart representation of a method 500 for controlling generator use and or electricity use at a premises to which electrical power is provided by one or more non-grid electrical power producing technologies. In some implementations, the method 500 is performed by a device that has processor and instructions stored on a computer-readable medium (e.g., CDAS device 320 of FIG. 4). In some implementations, the method 500 is performed by processing logic, including hardware, firmware, software, or a combination thereof. In some implementations, the method 500 is performed by a processor executing code stored in a non-transitory computer-readable medium (e.g., a memory).

At block 510, the method 500 receives historical electricity usage data from the building. The historical usage data may be maintained in memory locally, e.g., on the premises, in the CDAS, etc. or may be obtained from a remote storage location, such as a tracking server that manages data from one or more premises relating to electricity usage.

At block 510, the method 500 receives weather data or climate data for the building. In one implementation, the weather data is received from a remote weather/climate server that includes statistical data, facts, or forecasts related to weather and climate. In one implementation, a weather forecast associated with the current day and one or more subsequent days is obtained.

At block 530, the method 500 predicts expected electricity demand at the building based on the historical usage data. The prediction can be based on matching attributes of the current time period (e.g., the current hour, day, week, etc.) with those of prior time periods for which historical usage is known. For example, the prediction may be based on usage data from the same day last year, etc. In other implementations, an artificial intelligence or machine learning model is used to predict expected electricity demand based on historical usage data and/or other factors. For example, a neural network may be trained using historical usage data for a training set of multiple premises and then used to predict expected electricity demand for the particular premises based on the particular premises' usage data and/or characteristics.

At block 540, the method 500 predicts expected electricity production by one or more racks of photovoltaic cells on the premises of the building based on the weather data or the climate data. The prediction can be based on an algorithm or association between expected sunlight associated with various weather and/or climate conditions which would affect solar electricity production. For example, based on the weather prediction, the day may be classified as sunny, partially cloudy, cloudy, or precipitating. The expected electricity production can be predicted based on average values associated with prior days having these classifications. Additional information may be accounted for in the prediction. For example, date of the year, temperature (or other information associated with distance from the sun and thus strength of sunlight) may be used to make or adjust the prediction. Current conditions, for example obtained via sensors at the enclosure or solar panels, can also be used as indications of the strength of the sunlight and used in making and/or adjusting the predictions. The prediction for a given time increment can be made using predictions for smaller time increments. For example, a prediction for each hour of the day may be made and combined to provide a prediction for the entire day.

At block 550, the method 500 controls generator use or electricity use based on the expected electricity demand and the expected electricity production. Controlling the generator use can involve determining an electricity production requirement based on the expected electricity demand and the expected electricity production and determining an amount of generator use such that the combined electricity production by the one or more racks of photovoltaic cells and the amount of generator use satisfies the electricity production requirement. Controlling the electricity use can involve determining an electricity usage requirement based on the expected electricity demand and the expected electricity production and automatically controlling (e.g., reducing) electricity usage at the building by controlling one or more electricity consuming appliances based on the electricity usage requirement.

The method 500 may involve determining an amount of expected excess electricity based on the expected electricity demand and the expected electricity production. This expected excess electricity can then be used to automatically increase electricity usage at the building, for example, by controlling one or more electricity consuming appliances.

The method 500 may involve monitoring an amount of fuel available to the generator and determining to order additional fuel based on the amount of fuel available to the generator, the expected electricity demand, and/or the expected electricity production. The fuel can be ordered automatically, for example, via an electronic message send from the CDAS to a remote fuel supplier.

The method 500 may involve providing a notification, for example, to the homeowner, resident, occupant, or other user, related to historical electricity usage data for the building, weather data or climate data for the building, expected electricity demand at the building, expected electricity production by the one or more racks of photovoltaic cells, generator use, and/or electricity use. This information may help the user make more informed decisions about appliance use and other energy consuming activities.

In some implementations, method 500 switches a mode of operation between a plurality of predefined modes of operation, e.g., full power mode, an energy save mode, and an emergency power mode. The method 500 may switch between modes based on the predictions of energy production and consumption and/or notify the user of the mode switch. Using modes having defined operation parameters provides an intuitive way to convey to a user how the attributes of the system have been automatically adjusted to account for current predictions, e.g., the user is able to easily understand when the system is operating in full power mode, energy save mode, or emergency power mode without having to determine the state of the system by manually analyzing how the generator, battery, and solar power are being used. The user may approve, deny, control, monitor, or otherwise manually control the switching of modes in the system. The modes identified in this example are merely examples of a limited number of predefined, easy to identify modes that could be used in such implementations.

Figure 8:
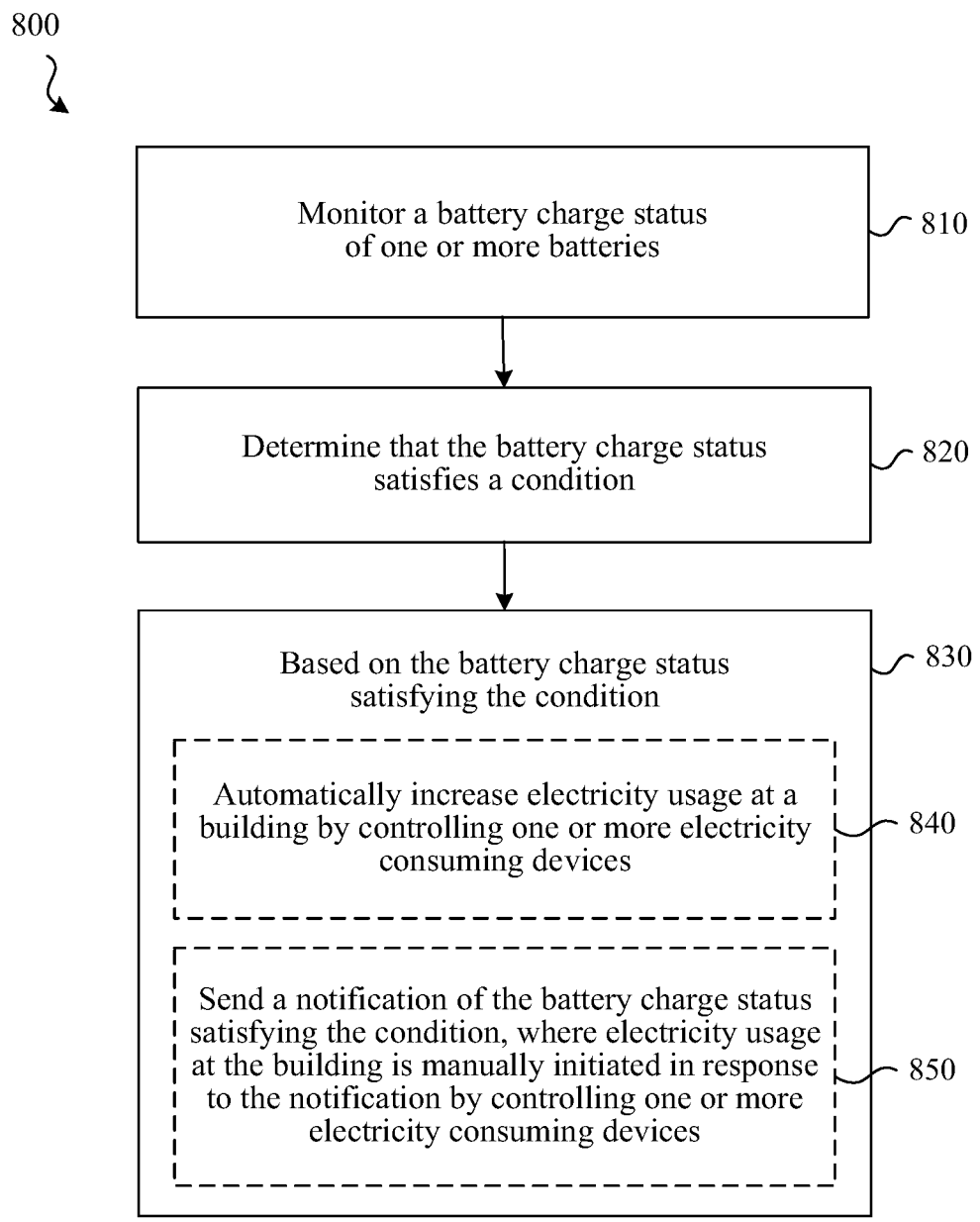
FIG. 8 is a flowchart representation of a method for managing stored energy according to some implementations.

FIG. 8 is a flowchart representation of a method for managing stored energy according to some implementations. In some implementations, the method 800 is performed by a device that has processor and instructions stored on a computer-readable medium (e.g., CDAS device 320 of FIG. 4). In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 monitors a battery charge status of one or more batteries. In some implementations, the one or more batteries are configured to store energy generated by one or more solar panel racks of photovoltaic cells and to provide power to a building using the stored energy.

At block 820, the method 800 determines that the battery charge status satisfies a condition. For example, this may involve determining that the battery charge status is full or above a threshold, e.g., above 99% full.

At block 830, based on the battery charge status satisfying the condition, the method 800 takes one or more actions. In some implementations, as shown in block 840, the method 800 automatically increases electricity usage at a building by controlling one or more electricity consuming devices. In some implementations, as shown in block 850, the method 800 sends a notification of the battery charge status satisfying the condition. Electricity usage at the building may then be manually initiated in response to the notification by controlling one or more electricity consuming devices. For example, a user may initiate a thermal store option and the method 800 may automatically control one or more devices to use some of the stored battery power to heat or cool air or water at the building.

In some implementations, controlling the one or more electricity consuming devices transfers at least some of the stored energy of the one or more batteries to stored thermal energy. In some implementations, controlling the one or more electricity consuming devices involves adjusting a thermostat to store thermal energy. For example, a thermostat may be lowered to cause an AC unit to run more to produce a colder air temperature within the building. In various examples, the stored thermal energy is accomplished by changing an air temperature within the building, a storage temperature within a refrigeration device, or a water temperature within a water heater. In some implementations, the one or more electricity consuming devices comprises a water heater, an air conditioning unit, a heater, or a well water pump.

In a distributed energy system, which cannot export power out to a utility grid, there may be situations in which the energy storage system is at full capacity. If during these times, there is still production to be had through the generation sources (such as solar, wind, or hydro, etc.), then it would normally be "lost" as it has no location to which to go. Techniques disclosed herein, such as method 800, may address such situations.

In some implementations, a system monitors and observes when the energy storage system is at maximum capacity. The system may be configured to take one or more steps in response to such a determination. The system may notify the owner/user and recommend load usage/thermal adjustments. The system may control and adjust the loads and systems to which it has access. In some implementations, the adjustments involve using the temperature control and HVAC systems to turn the building into thermal storage. For example, during a hot season (e.g., summer in the United States), the system may activate the air conditioner(s) to cool the building down to a defined lowest temperature allowed value, prior to when the owner might normally adjust the temperature, to pre-cool the building and prevent load usage in the evening when the generation source (solar) is limited or gone. In another example, the system may cause the filling of an electric hot water tank, which functions as thermal storage of the excess energy. In another example, the system may turn on heavy loads which are not time dependent, such as dishwashers, laundry machines, and EV chargers. This "load-adding" automated functionality may depend data such as weather conditions, usage history, time of year, and user-defined settings.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A system for providing electricity to a building, the system comprising:
    a first power source comprising one or more solar panel racks of photovoltaic cells or one or more generators, the first power source installed on a premises of the building;
    an enclosure installed at the premises, wherein the enclosure at least partially encloses or comprises:
    one or more batteries electrically configured to store energy;
    one or more inverters electronically connected to the one or more solar panel racks and the one or more batteries and configured to convert direct current (DC) current electricity from the one or more solar panel racks and the one or more batteries to alternating current (AC) electricity;
    one or more electronical connections connecting the system to a utility power supply, wherein one or more switches are configured to control whether power is supplied to the premises via the utility power supply, wherein the one or more switches comprises an isolation switch, wherein, when the isolation switch is closed, a second power source separate from the first power source provides power to the building and the one or more batteries; and
    one or more electrical wires electrically connecting the system to a main panel of the building, wherein the main panel is configured to provide power received from the system to the building; and
    wherein the enclosure further comprises a disconnect configured to enable disconnection of components of the enclosure from an interconnection point of the main panel of the building or disconnection of the components of the enclosure from the first power source; and
    wherein the system is configured to be installed by:
        connecting the one or more electrical wires electrically to the main panel of the building; and
        connecting the one or more electrical connections to the utility power supply;
        wherein the main panel of the building is connected to the system and receives utility power from the utility power supply via the system rather than being directly connected to the utility power supply to receive power directly from the utility power supply.

2. The system of claim 1, wherein the one or more solar panel racks comprise sheets of the photovoltaic cells supported by ballasts on a ground surface of the premises.

3. The system of claim 1, wherein components of the enclosure are pre-connected prior to deliver and installation of the system at the premises.

4. The system of claim 1, wherein the enclosure has an externally-facing outlet for connecting one or more devices to excess load.

5. The system of claim 1, wherein the system provides an electric vehicle (EV) charger.

6. The system of claim 1, wherein the system is configured to control and send power to an electric vehicle (EV) charger based on energy storage or load.

7. The system of claim 1, wherein the system is configured to control and draw power from an electric vehicle (EV) or EV charger system based on energy storage or load.

8. The system of claim 1, wherein the enclosure fully encloses the one or more batteries and one or more inverters.

9. The system of claim 1, wherein the enclosure comprises a roof having a slanted portion configured to facilitate precipitation runoff.

10. The system of claim 1, wherein the enclosure is a shed-type structure.

11. The system of claim 1, wherein the enclosure is located beneath at least one of the one or more solar panel racks.

12. The system of claim 1, wherein the enclosure comprises heating, ventilation, and air-conditioning (HVAC) components configured to monitor a temperature, humidity, or another condition within the enclosure and produce heat, air-conditioning, or control the another condition based on efficiency, safety, or operation criteria.

\* \* \* \* \*